(12) United States Patent
Urabe et al.

(10) Patent No.: US 10,538,676 B2
(45) Date of Patent: Jan. 21, 2020

(54) SURFACE LAYER-PEELABLE COMPOSITE COATING FILM, COATING COMPOSITION FOR FORMING COMPOSITE COATING FILM, AND METHOD

(71) Applicant: NIPPON PAINT HOLDINGS CO., LTD., Osaka (JP)

(72) Inventors: Kengo Urabe, Tokyo (JP); Mika Iga, Tokyo (JP); Yasunori Minato, Tokyo (JP)

(73) Assignee: NIPPON PAINT HOLDINGS CO., LTD., Osaka (JP)

(*) Notice: Subject to any disclaimer, the term of this patent is extended or adjusted under 35 U.S.C. 154(b) by 90 days.

(21) Appl. No.: 15/740,093

(22) PCT Filed: Jun. 29, 2016

(86) PCT No.: PCT/JP2016/069349
§ 371 (c)(1),
(2) Date: Dec. 27, 2017

(87) PCT Pub. No.: WO2017/002885
PCT Pub. Date: Jan. 5, 2017

(65) Prior Publication Data
US 2018/0194951 A1 Jul. 12, 2018

(30) Foreign Application Priority Data

Jul. 1, 2015 (JP) .................. 2015-132782
Jun. 29, 2016 (JP) .................. 2016-128592

(51) Int. Cl.
| C09D 5/20 | (2006.01) |
| C09D 7/40 | (2018.01) |
| C09D 167/08 | (2006.01) |
| B32B 7/06 | (2019.01) |
| B32B 27/18 | (2006.01) |
| B32B 27/36 | (2006.01) |
| B32B 27/08 | (2006.01) |
| B05D 7/24 | (2006.01) |
| C09D 201/00 | (2006.01) |
| B05D 5/00 | (2006.01) |

(52) U.S. Cl.
CPC .............. *C09D 5/20* (2013.01); *B05D 5/005* (2013.01); *B05D 7/24* (2013.01); *B32B 7/06* (2013.01); *B32B 27/08* (2013.01); *B32B 27/18* (2013.01); *B32B 27/36* (2013.01); *C09D 7/40* (2018.01); *C09D 167/08* (2013.01); *C09D 201/00* (2013.01); *B32B 2305/72* (2013.01); *B32B 2305/77* (2013.01); *B32B 2307/748* (2013.01)

(58) Field of Classification Search
CPC .......... C09D 5/20; C09D 7/46; C09D 167/08; B32B 27/18; B32B 27/36; B32B 2307/748
See application file for complete search history.

(56) References Cited

U.S. PATENT DOCUMENTS 6,428,613 B1 * 8/2002 Matsunaga ............ C08K 5/098
106/264
6,489,398 B1 12/2002 Zückert et al.
2008/0035881 A1 2/2008 Kim

FOREIGN PATENT DOCUMENTS

| CN | 101386770 | | 3/2009 |
| CN | 103937393 | | 7/2014 |
| JP | 64-20274 | | 1/1989 |
| JP | 2-500450 | | 2/1990 |
| JP | 2-99566 | | 4/1990 |
| JP | 02 170877 | * | 7/1990 |
| JP | 2-170877 | | 7/1990 |
| JP | 8-503987 | | 4/1996 |
| JP | 8-259643 | | 10/1996 |
| JP | 8-283357 | | 10/1996 |
| JP | 2003 138214 | * | 5/2003 |
| JP | 2003-138214 | | 5/2003 |
| JP | 2008-38123 | | 2/2008 |
| JP | 2015-189792 | | 11/2015 |
| WO | 87/07627 | | 12/1987 |

OTHER PUBLICATIONS

JP 2003 138214 machine translation (2003).*
JP 02 170877 machine translation (1990).*
MEKO Material Safety Data Sheet (http://www.holmberg.se/upload/product/files/msds-methyl-ethyl-ketoxime-meko-eng-2011-06-29---607.pdf)(date unknown).*
Odian (Principles of Polymerization, 4th Ed., Wiley-Interscience, 2004, pp. 118-120).*
International Search Report dated Aug. 16, 2016 in International (PCT) Application No. PCT/JP2016/069349.
Extended European Search Report dated Feb. 18, 2019 in corresponding European Patent Application No. 16817993.5.
International Preliminary Report on Patentability dated Jan. 2, 2018 in International (PCT) Application No. PCT/JP2016/069349.
"A Handbook of Usual Crude Material for Fine Chemical Industry", 1: 407-408, (2003).

* cited by examiner

*Primary Examiner* — Kuo Liang Peng
(74) *Attorney, Agent, or Firm* — Wenderoth, Lind & Ponack, L.L.P.

(57) ABSTRACT

The present invention provides an oxidative polymerization resin-based composite coating film capable of being renewed a number of times by peeling a coating-film surface layer. More specifically, a coating composition comprising a base resin composition containing an oxidative polymerization resin; an organic compound having a melting point of 5 to 150° C.; a dryer; and an oxidative polymerization inhibitor containing at least one of a dryer protectant and a radical inhibitor is used to form a composite coating film made up of a cured film layer and an uncured inner layer.

10 Claims, 2 Drawing Sheets

(a)

(b)

(c)

SURFACE LAYER-PEELABLE COMPOSITE COATING FILM, COATING COMPOSITION FOR FORMING COMPOSITE COATING FILM, AND METHOD

TECHNICAL FIELD

The present invention provides a surface layer-peelable composite coating film, a coating composition for forming such a composite coating film, and a method thereof.

BACKGROUND ART

An alkyd resin is an oxidative polymerization resin synthesized from a polybasic acid or a polybasic acid anhydride, a polyhydric alcohol, and a fatty acid, and the oxidative polymerization resin undergoes ester oxidation polymerization due to oxygen in air at ordinary temperature to form a three-dimensional network structure, resulting in a coating film with high solvent resistance and water resistance. An alkyd resin-based coating material is usable for various materials and is inexpensive and therefore useful for a wide range of applications from indoor wall coating to coating of large structures such as buildings, ships, and vehicles.

For a coating material containing an alkyd resin, Patent Document 1 discloses a radically curable resin composition and a covering material that are useful as a civil engineering and building material retaining low-temperature flexibility with high low-temperature curing property. This resin composition contains (A) a polyether acryl urethane resin, (B) an air-drying property imparting type polymer using a drying oil and/or a fatty acid-based compound thereof, and (C) an ethylenically unsaturated monomer. The component (B) is preferably an alkyd resin. For the purpose of improving a drying property, paraffin and/or wax (D) may be used together in this resin composition in addition to the components (A) to (C).

Patent Document 2 discloses a radically curable resin composition and a covering material that are suitable for a wide range of civil engineering and building material applications as in Patent Document 1. This resin composition contains (A) a resin having a (meth)acryloyl group at a molecular end, (B) an air-drying property imparting type polymer using a drying oil and/or a fatty acid-based compound thereof, and (C) an ethylenically unsaturated monomer having a (meth)acryloyl group with a molecular weight of 160 or more. The component (B) is preferably an alkyd resin. For the purpose of improving a drying property, paraffin and/or wax (D) may be used together in this resin composition in addition to the components (A) to (C).

Patent Document 3 discloses a coating composition having a thermosetting film formability and based on wax or a wax-like compound (e.g., polyethylene wax, paraffin wax) or a natural drying oil or an alkyd resin. This coating composition is used for preventing corrosion of a metal base material of a vehicle body, and an additive gelling at a relatively high temperature (e.g., polyvinyl chloride, and $C_{1-8}$ alkyl ester of methacrylic acid or acrylic acid) can be added in a small amount so as to completely prevent coating from flowing or dripping.

PRIOR ART DOCUMENTS

Patent Documents

Patent Document 1: Japanese Laid-Open Patent Publication No. 8-259643

Patent Document 2: Japanese Laid-Open Patent Publication No. 8-283357

Patent Document 3: Japanese Unexamined Patent Application Publication (Translation of PCT Application) No. 8-503987

SUMMARY OF THE INVENTION

Problem to be Solved by the Invention

When a surface of a coating film is scratched or soiled, or when the function imparted to the coating film is deactivated, recoating is required. The recoating is more difficult in places where the recoating is more required, such as hospital rooms and precision equipment rooms that must always be kept clean, windscreens on roads frequently damaged or contaminated, high humidity places, and factories.

Since conventional typical coating films are designed to be completely cured, difficult recoating is necessary when a coating film surface is damaged or contaminated or the function thereof is deactivated.

This leads to a problem of development of a coating composition, for example, a highly versatile alkyd resin-based coating composition, capable of forming a coating film that can be renewed a number of times by peeling a coating-film surface layer.

Means for Solving Problem

As a result of intensive studies for solving the problem, the present inventors found that by using a certain coating composition containing a flow-inhibitory and polymerization-reaction-inhibitory substance, a dryer, and an oxidative polymerization inhibitor for an oxidative polymerization resin, a composite coating film made up of a cured film layer and an uncured inner layer can be formed. The film layer of this composite coating film can be peeled off and the surface of the uncured inner layer allowed to appear by peeling is exposed to oxygen so that a surface layer is dried and cured to form a new film layer.

The present invention provides a coating composition comprising a base resin composition containing an oxidative polymerization resin; an organic compound having a melting point of 5 to 150° C.; a dryer; and an oxidative polymerization inhibitor containing at least one of a dryer protectant and a radical inhibitor.

Additionally, the present invention provides a composite coating film comprising a film layer; and an inner layer, wherein the inner layer is an uncured body of the coating composition of the present invention, while the film layer is a cured body of the coating composition formed in a peelable manner on a surface of the inner layer, and wherein a surface layer of the inner layer exposed to air by peeling the film layer formed on the inner layer is cured due to oxidative polymerization so that another film layer is formable in a peelable manner.

Furthermore, the present invention provides a method of manufacturing a composite coating film made up of a film layer and an inner layer such that the film layer is formed in a peelable manner on a surface of the inner layer, the method comprising the steps of applying the coating composition of the present invention onto a basal plate to form a coating film made up of an uncured body of the coating composition; and exposing the coating film made up of the uncured body to air to cure a surface layer thereof due to oxidative polymerization so as to form the film layer while maintaining a portion under the film layer in an uncured state as an inner layer.

Effect of the Invention

The composite coating film according to the present invention can be formed by applying the coating composition of the present invention onto a base material and exposing the coating composition to oxygen in air and, when the surface thereof is damaged or contaminated or a function imparted thereto is deactivated, only the film layer can be peeled off to renew the surface layer one or more times.

Furthermore, the composite coating film according to the present invention can be used as an underlayer with a top coating material applied, or with an interior material such as an exterior material and a wallpaper material applied, thereon to form an upper layer, and the upper layer can easily be renewed by peeling the composite film layer of the present invention.

MODES FOR CARRYING OUT THE INVENTION

Figure 1:
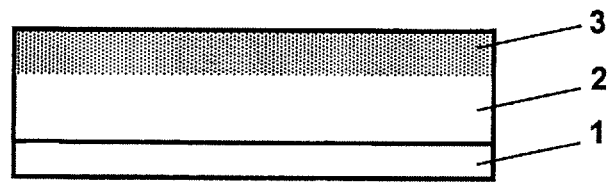
FIG. 1 is a schematic of a composite coating film of the present invention and peeling of a film layer thereof.
Figure 1:
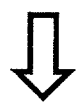
Figure 1:
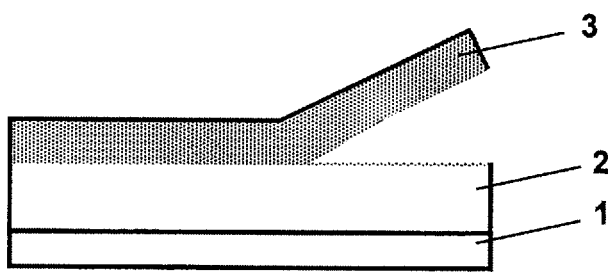

The present invention will now be described in detail with preferred embodiments.
1. Coating Composition A coating composition of the present invention comprises a base resin composition containing an oxidative polymerization resin; an organic compound having a melting point of 5 to 150° C.; a dryer; and an oxidative polymerization inhibitor containing at least one of a dryer protectant and a radical inhibitor, and comprises, in one form, the 10 to 100 wt % organic compound based on the 100 wt % base resin composition and an effective amount of the dryer such that a content of metal elements in the dryer is 0.001 to 1.5 wt % based on 100 wt % solid content of the oxidative polymerization resin, and if the oxidative polymerization inhibitor contains any one of the dryer protectant and the radical inhibitor,
0.5 to 4 moles of the dryer protectant is contained per mole of metal elements in the dryer; or
the 0.01 to 2.0 wt % radical inhibitor is contained based on 100 wt % solid content of the oxidative polymerization resin; or if the oxidative polymerization inhibitor contains both the dryer protectant and the radical inhibitor,
when 0.5 to 4 moles of the dryer protectant is contained per mole of metal elements in the dryer, the 2.0 wt % or less radical inhibitor is contained based on 100 wt % solid content of the oxidative polymerization resin; or
when less than 0.5 moles of the dryer protectant is contained per mole of metal elements in the dryer, the 0.01 to 2.0 wt % radical inhibitor is contained based on 100 wt % solid content of the oxidative polymerization resin.

In the present invention, the base resin composition is a resin composition containing at least an oxidative polymerization resin and may further contain an oxidative polymerization compound, and a coating resin without an oxidative polymerization group.

In the present invention, the oxidative polymerization resin contained in the base resin composition is a resin containing an oxidative polymerization group undergoing an oxidative polymerization reaction due to a reaction with oxygen in air to be three-dimensionally crosslinked, and examples thereof include, but not limited to, an alkyd resin that is a reaction product of a polybasic acid or polybasic acid anhydride, a fatty acid, and a polyhydric alcohol, a reaction product of an acrylic resin or a urethane resin and a fatty acid, etc.

Examples of the polybasic acid or polybasic acid anhydride in the alkyd resin usable in the present invention include, but are not limited to, compounds having two or more carboxyl groups in molecules of dicarboxylic acids such as succinic acid, glutaric acid, adipic acid, pimelic acid, suberic acid, azelaic acid, itaconic acid, maleic acid, fumaric acid, phthalic acid, isophthalic acid, and terephthalic acid; tricarboxylic acids such as trimellitic acid; and tetracarboxylic acids such as pyromellitic acid, and acid anhydrides thereof.

Examples of the fatty acid in the alkyd resin usable in the present invention include, but not limited to, a fatty acid contained in drying oil having an iodine value of 130 or more selected from the group consisting of linseed oil, tung oil, poppy-seed oil, perilla oil, sunflower oil, and safflower oil; a fatty acid contained in semi-drying oil having an iodine value of 100 to 130 selected from the group consisting of soybean oil, rice bran oil, cottonseed oil, and sesame oil; a fatty acid contained in non-drying oil having an iodine value of less than 100 selected from the group consisting of olive oil, almond oil, peanut oil, coconut oil, camellia oil, rapeseed oil, and castor oil. Examples of such fatty acids include, but not limited to, unsaturated fatty acids such as palmitoleic acid, oleic acid, linoleic acid, and linolenic acid.

Examples of the polyhydric alcohol in the alkyd resin usable in the present invention include, but not limited to, diols selected from the group consisting of ethylene glycol, diethylene glycol, propylene glycol, 1,2-propanediol, 1,3-propanediol, 1,2-butanediol, 1,3-butanediol, 1,4-butanediol, 2,3-butanediol, 1,5-pentanediol, 1,6-hexanediol, 2,2-diethyl-1,3-propanediol, neopentyl glycol; trivalent or higher polyols selected from the group consisting of triethylene glycol, trimethylol propane, trimethylol ethane, glycerine, and pentaerythritol; and hydroxycarboxylic acid selected from the group consisting of 2,2-dimethylolpropionic acid, 2,2-dimethylol butanoic acid, 2,2-dimethylol pentanoic acid, 2,2-dimethylol-hexanoic acid, and 2,2-dimethylol octanoic acid.

The fatty acid in the reaction product of the acrylic resin or urethane resin and the fatty acid usable in the present invention is the same as the fatty acid in the alkyd resin usable in the present invention.

The solid content of the oxidative polymerization resin is 70 to 100 wt %, preferably 85 to 100 wt %, more preferably 95 to 100 wt % in the solid content of the total base resin composition. When the content of the oxidative polymerization resin is within the range, the drying property of the coating film is ensured.

The oxidative polymerization compound allowed to be contained in the base resin composition in the present invention is a compound containing an oxidative polymerization group undergoing an oxidative polymerization reaction due to a reaction with oxygen in air to be three-dimensionally crosslinked, and examples thereof include, but not limited to, fatty acids contained in drying oil having an iodine value of 130 or more selected from the group consisting of linseed oil, tung oil, poppy seed oil, perilla oil, sunflower oil, and safflower oil; and fatty acids contained in semi-drying oil having an iodine value of 100 to 130 selected from the group consisting of soybean oil, rice bran oil, cottonseed oil, and sesame oil. Examples of such fatty acids include, but are not limited to, unsaturated fatty acids such as palmitoleic acid, oleic acid, linoleic acid, and linolenic acid.

In the present invention, examples of the coating resin without an oxidative polymerization group allowed to be contained in the base resin composition are common coating resins including acrylic resin, urethane resin, epoxy resin, polyester resin, etc.

In the present invention, the organic compound having a melting point of 5 to 150° C. is a compound that can be kneaded with the base resin composition at a temperature not lower than the melting point such that an obtained mixture forms a coating film structure without flowing at a temperature of usage environment of the coating film. Therefore, an inner layer of the composite coating film made up of an uncured body can form and maintain the coating film structure without flowing in the usage environment due to the action of the organic compound. Additionally, the organic compound has a function of intervening between components of the oxidative polymerization resin so as to hinder the approach between the oxidative polymerization resins and thereby inhibit a dry curing reaction due to an oxidative polymerization reaction. Therefore, in the present invention, the organic compound can be regarded as a flow-inhibitory and polymerization-reaction-inhibitory substance.

In the present invention, if the melting point of the organic compound is 5° C. or higher, the coating film structure can be formed in usual usage environment etc. If the melting point is 150° C. or less, excessive heating is not required at the time of kneading with the base resin composition.

Examples of the organic compound usable in the present invention include, but not limited to, liquid paraffin, paraffin wax, microcrystalline wax, polyethylene, polyacrylamide, polyacrylate, animal wax, vegetable wax, higher fatty acid, higher alcohol, amines, ketones, esters, etc. These organic compounds can be used singly or as a mixture of two or more compounds. Paraffins are alkanes represented by $C_nH_{2n+2}$, and include paraffins in the forms of liquid and solid at ordinary temperature depending on the carbon number or molecular weight. Paraffins in the form of liquid are referred to as liquid paraffin, while paraffins in the form of solid are referred to as paraffin wax. The paraffin wax is generally classified by the melting point rather than the carbon number or molecular weight. The paraffin wax includes, for example, those having a low melting point (about 42° C.) to a high melting point (about 70° C.), and those having a higher melting point. In the present invention, paraffin wax, polyethylene, or a combination thereof is preferable.

The content of the organic compound is preferably 10 to 100 wt % based on the 100 wt % base resin composition. The content less than the lower limit leads to vulnerability to a change in temperature of the usage environment, and the content larger than the upper limit leads to an increase in time required for forming the film layer. To improve workability of peeling and ensure the number of times of peeling, the content is more preferably 15 to 50 wt %, further preferably 20 to 40 wt %.

In the present invention, the dryer is a compound promoting oxidative polymerization of the oxidative polymerization resin such as an alkyd resin, and mainly promotes generation of a peroxide through hydrogen abstraction of an α-methylene group of a double bond in the presence of oxygen, and generation of oxygen radicals due to decomposition of the generated peroxide. The polymerization proceeds due to a radical chain reaction to form a coating film with a three-dimensional network structure.

Examples of the dryer usable in the present invention include a metal soap composed of bonding between a metal and a long chain fatty acid. Examples of the metal usable for the metal soap include, but not limited to, metals such as cobalt, barium, vanadium, manganese, cerium, lead, iron, calcium, zinc, zirconium, nickel, tin, and strontium, preferably cobalt and manganese having a favorable surface drying property, more preferably cobalt. Examples of the long-chain fatty acid usable for the metal soap include, but not limited to, organic acids such as propionic acid, octylic acid, naphthenic acid, neodecanoic acid, tung oil acid, linseed oil acid, soybean oil acid, and resin acid, preferably propionic acid, naphthenic acid, and octylic acid, more preferably naphthenic acid and octylic acid. The metal soap usable in the present invention is preferably a cobalt salt of naphthenic acid or octylic acid, more preferably a naphthenic acid cobalt salt.

The content of the dryer is preferably an amount in which the content of metal elements in the dryer is 0.001 to 1.5 wt % based on 100 wt % solid content of the oxidative polymerization resin. The content less than the lower limit leads to an increase in time required for forming the film layer, and the content larger than the upper limit tends to cause a defect in appearance such as shrinkage in the film layer. To improve workability of peeling and ensure the number of times of peeling, the content is more preferably 0.01 to 1.0 wt %, further preferably 0.05 to 0.5 wt %.

In the present invention, the oxidative polymerization inhibitor is an agent inhibiting the oxidative polymerization reaction due to a reaction with oxygen in air by the oxidative polymerization resin and the oxidative polymerization compound contained in the base resin composition, and contains a dryer protectant and a radical inhibitor. The dryer protectant and the radical inhibitor can be used singly or in combination.

In the present invention, the dryer protectant is a substance inhibiting the oxidative polymerization promoting effect of the dryer when coexisting with the dryer. Since a volatile dryer protectant is used in the coating composition of the present invention, the dryer protectant disappears due to volatilization in the vicinity of the surface of the coating film, and the oxidative polymerization promoting effect of the dryer is exerted. Consequently, only the surface layer of the coating film is cured to form a film layer. This film layer suppresses the volatilization of the inner dryer protectant and the oxidative polymerization promoting effect of the dryer is inhibited, so that the inner layer is maintained uncured.

The dryer protectant usable in the present invention is a volatile substance having a boiling point of 300° C. or less, and example thereof include, but not limited to, methyl ethyl ketoxime, acetone oxime, butyl aldoxime, cyclohexanone oxime, dialkyl hydroxylamine, ammonia, hydroxylamine, triethylamine, dimethylethanolamine, etc. The dryer protectant is preferably methyl ethyl ketoxime and cyclohexanone oxime.

The content of the dryer protectant is preferably 0.5 to 4 moles per mole of metal elements in the dryer. The content less than the lower limit makes the film layer thicker, and the content larger than the upper limit leads to an increase in time required for forming the film layer. To improve workability of peeling and ensure the number of times of peeling, the content is more preferably 1 to 3 moles, further preferably 1.5 to 2.5 moles. When a plurality of dryer protectants is used in combination, the total amount may be within the range described above.

In the present invention, unlike the dryer protectant, the radical inhibitor is not a substance inhibiting the promotion of oxidative polymerization of the dryer and is a substance directly inhibiting the oxidative polymerization initiation function of radicals present in a system. Since the volatile radical inhibitor is used in the coating composition of the present invention, the radical inhibitor disappears due to volatilization in the vicinity of the surface of the coating film, and the oxidative polymerization initiation function of the radicals is exerted. Consequently, only the surface layer of the coating film is cured to form a film layer. This film layer suppresses the volatilization of the inner radical inhibitor and the oxidative polymerization initiation function of the radicals is inhibited, so that the inner layer is maintained uncured.

The radical inhibitor usable in the present invention is a volatile substance having a boiling point of 300° C. or less, and example thereof include, but not limited to, phenolic substances such as eugenol, butylated hydroxytoluene, and butylated hydroxyanisole; and phosphite substances such as trimethyl phosphite, triethyl phosphite, and tributyl phosphite. The radical inhibitor is preferably eugenol and tributyl phosphite.

The content of the radical inhibitor is preferably 0.01 to 2.0 wt % based on 100 wt % solid content of the oxidative polymerization resin. The content less than the lower limit makes the film layer thicker, and the content larger than the upper limit leads to an increase in time required for forming the film layer. To improve workability of peeling and ensure the number of times of peeling, the content is more preferably 0.03 to 1.0 wt %, further preferably 0.05 to 0.5 wt %. When a plurality of radical inhibitors is used in combination, the total amount may be within the range described above.

When the dryer protectant and the radical inhibitor are used in combination, the dryer protectant can be contained in an amount of 4 moles or less per mole of metal elements in the dryer, and the radical inhibitor can be contained in a range of 2.0 wt % or less based on 100 wt % solid content of the oxidative polymerization resin. However, the dryer protectant in the range of less than 0.5 moles per mole of metal elements in the dryer and the radical inhibitor in the range of less than 0.01 wt % based on 100 wt % solid content of the oxidative polymerization resin are excluded since the oxidative polymerization inhibition effect cannot sufficiently be exerted.

Because of the composition described above, the coating composition of the present invention can be applied onto a basal plate to form a coating film made up of an uncured body of the coating composition and, by exposing the coating film to air, the surface layer thereof can be cured due to oxidative polymerization to form a composite coating film made up of a cured film layer and an inner layer in an uncured state under the film layer. Since the inner layer of the obtained composite coating film is maintained in the uncured state, the film layer can be peeled off, and the surface layer of the inner layer exposed to air by peeling the film layer is cured due to oxidative polymerization, so that another film layer is newly formed. As long as the inner layer in the uncured state exists, the film layer can be peeled off a number of times to renew the surface layer of the coating film.

To the coating composition of the present invention, a pigment component can generally be added in addition to the essential components described above. Examples of the pigment component usable in the present invention include, but not limited to, color pigments such as titanium dioxide, carbon black, red iron oxide, and phthalocyanine blue, extender pigments such as calcium carbonate, talc, mica, and clay, and antirust pigments. The content of the pigment component in the coating material is preferably 0.1 to 70%, more preferably 0.1 to 50%, in terms of the pigment weight concentration (PWC) based on the solid content of the coating composition. If the PWC is too low, the concealing property of the coating film may not be sufficient, and if the PWC is too high, the film layer may become difficult to form.

The coating composition of the present invention can further contain commonly used coating additives. Examples of the coating additives usable in the coating composition of the present invention can include, but not limited to, ultraviolet absorbers, light stabilizers, viscosity modifiers, surface conditioners, antioxidants, fungicides, plasticizers, antifoamers, etc. The coating additives are generally used in an amount of 0.01 to 10 wt % based on the 100 wt % coating composition.

An organic solvent can also be contained in the coating composition of the present invention to the extent that the effects of the present invention are not affected.

2. Composite Coating Film

As shown in FIG. 1, the composite coating film of the present invention is a composite coating film made up of a film layer 3 and an inner layer 2 formed by using the coating composition of the present invention, and the film layer 3 formed on the inner layer 2 is peelable. The surface layer of the inner layer 2 allowed to appear by peeling the film layer 3 is exposed to air and cured due to oxidative polymerization to separately form the new film layer 3.

For a coating method, any suitable method can be adopted depending on a type of base material etc. Although not particularly limited, examples of the method include application with a brush, a trowel, a roller, air spray, airless spray, etc.

In the composite coating film of the present invention, the inner layer 2 is an uncured body of the coating composition of the present invention, and the film layer 3 is a cured body of the coating composition formed in a peelable manner on the surface of the inner layer 2. As described above, only the film layer 3 is cured and therefore can be peeled off and, since the inner layer 2 is not cured, the surface layer of the inner layer 2 exposed to air by peeling the film layer 3 is cured so that the surface layer of the coating film can be renewed (FIG. 1).

In the composite coating film of the present invention, when the coating film surface layer is determined as being surface-dry based on the definition of JIS K 5600-3-2 (Ballotini method described later) under an atmosphere at 23° C., it is judged that the film layer 3 is formed.

In the composite coating film of the present invention, the inner layer must be maintained in an uncured state. Therefore, it is necessary to confirm that the inner layer is uncured for the composite coating film when it is judged that the film layer is formed.

Figure 3:
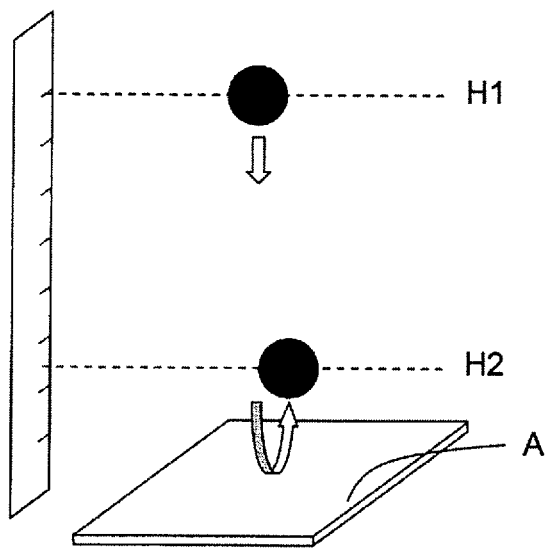
FIG. 3 is a schematic for explaining a measurement method of rebound resilience.

In the present invention, as shown in FIG. 3, a rubber ball is dropped onto the composite coating film to obtain rebound resilience from the rebound height of the ball. In the present invention, when the rebound resilience under an atmosphere at 23° C. is 11 to 55%, it is judged that the inner layer is uncured.

Even though being within the range described above, if the rebound resilience subsequently goes out of the range, this means that the curing of the inner layer is proceeding. Therefore, once the rebound resilience within the range is exhibited, the rebound resilience is desirably within the range after long-term aerial exposure, for example, after six-month aerial exposure at 23° C.

The thickness of the film layer 3 as described above is in the range of 10 μm to 5 mm. Since the film layer 3 having a thickness within the range of 10 μm to 5 mm is newly formed in the surface layer of the inner layer 2 by peeling the film layer 3, the film layer 3 can be peeled off one or more times when the inner layer 2 has a thickness equal to or greater than the thickness of the film layer 3.

The composite coating film of the present invention can be used as a single-layer coating film or can be used as an underlayer with a top coating material applied, or with an interior material such as an exterior material and a wallpaper material applied, to an upper surface thereof to form an upper layer. The top coating material, the interior material such as an exterior material and a wallpaper material, etc. are not particularly limited and those generally used are usable.

3. Method of Manufacturing Composite Coating Film

Figure 2:
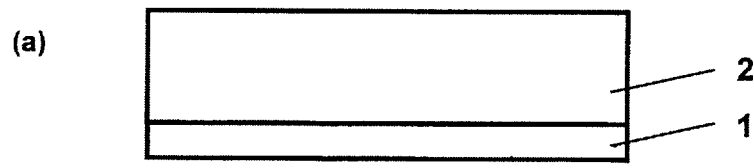
FIG. 2 is a schematic of steps of formation of the composite coating film of the present invention.
Figure 2:
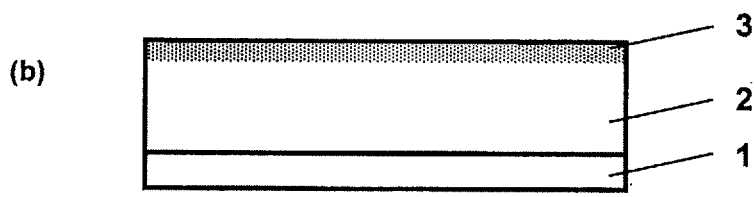
Figure 2:
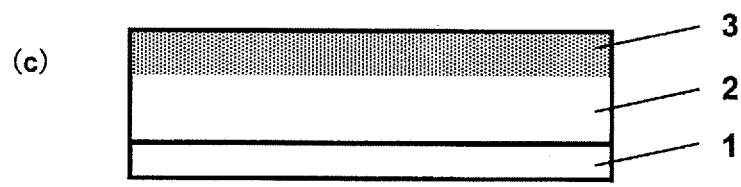

A method of manufacturing the composite coating film of the present invention comprises
  a step of applying the coating composition of the present invention onto a basal plate 1 to form a coating film made up of an uncured body of the coating composition (FIG. 2a); and
  a step of exposing the coating film made up of an uncured body to air to cure the surface layer thereof due to oxidative polymerization so as to form the film layer 3 while maintaining a portion under the film layer 3 in an uncured state as the inner layer 2 (FIGS. 2b and 2c).

More specifically, for example, the coating film made up of an uncured body is exposed to air at 5 to 150° C. for one day or 20 minutes or longer to cure the surface layer thereof due to oxidative polymerization so as to form the film layer 3. Since the oxidative polymerization inhibitor present in the vicinity of the uncured surface layer volatilizes, the oxidative polymerization reaction promoting effect of the dryer is exerted, or the oxidative polymerization initiation function of the radicals present in the system is exhibited, so that only the surface layer is cured. On the other hand, since the oxidative polymerization inhibitor is present in the inner layer 2 under the film layer, the oxidative polymerization reaction promoting effect of the dryer is inhibited, or the oxidative polymerization initiation function of the radicals present in the system is suppressed and, additionally, penetration of oxygen is prevented by the film layer of the cured surface layer. Furthermore, due to the effect of the organic compound inhibiting the approach between the oxidative polymerization resins, so that the inner layer 2 is maintained uncured. Drying conditions can appropriately be adjusted such that only the surface layer cures.

EXAMPLES

The present invention will hereinafter more specifically be described based on Examples and Comparative Examples; however, the present invention is not limited to the following Examples.

1. Preparation of Coating Composition

Example 1

In a preparatory stage, alkyd resin varnish (BECKOSOL P-470-70; DIC Corporation) was wormed to 40° C., and paraffin (melting point: 42 to 44° C.) (Wako Pure Chemical Industries) and powder polyethylene (Neowax L (melting point: 95 to 115° C.) (Yasuhara Chemical)) were heated to 70° C. and 130° C., respectively, into a liquid state. Paraffin and polyethylene in a liquid state were mixed while stirring the alkyd resin varnish wormed to 40° C. with a disperser. Subsequently, a dryer protectant (2-butanone oxime (Tokyo Chemical Industry)) and a dryer (cobalt naphthenate mineral spirit solution (Co: 6%)) (Wako Pure Chemical Industries) were sequentially mixed and stirred at 300 rpm for five minutes. The components were combined according to Table 1.

From the atomic weight of cobalt: 58.93 and the molecular weight of 2-butanone oxime: 87.12, the number of moles of the dryer protectant per mole of metal elements in the dryer was calculated.

After completion of stirring, the mixture was visually confirmed as being homogeneous and used as a coating composition.

Example 2

A coating composition was prepared as in Example 1 by combining the components according to Table 1 except that polyethylene was not added.

Examples 3 to 5

A coating composition was prepared as in Example 1 by combining the components according to Table 1 except that the polyethylene was not added and that the ratio between the alkyd resin and the paraffin was changed.

Examples 6 to 8

A coating composition was prepared as in Example 1 by combining the components according to Table 1 except that the alkyd resin varnish was changed to alkyd resin varnish (BECKOSOL EL-8001; DIC Corporation), alkyd resin varnish (BECKOSOL EL-4501-50; DIC Corporation), or modified alkyd resin varnish (STYRESOL J-719; DIC Corporation).

Examples 9 and 10

A coating composition was prepared as in Example 1 by combining the components according to Table 2 except that the alkyd-modified urethane resin (BURNOCK TD-125-HV; DIC Corporation) or acrylic resin (ACRYDIC A-1300; DIC Corporation) was mixed as a resin other than the alkyd resin with the base resin composition.

Examples 11 and 12

A coating composition was prepared as in Example 1 by combining the components according to Table 2 except that paraffin (melting point: 50 to 52° C.) (Showa Chemical Industry) and paraffin (melting point: 60 to 62° C.) (Kishida Chemical) were used.

Examples 13 to 15

A coating composition was prepared as in Example 1 by combining the components according to Table 2 except that a dryer (cobalt octanoate xylene solution (Co: 6%)) (DIC Corporation) was used or the additive amount of the dryer (cobalt naphthenate mineral spirit solution (Co: 6%)) was changed.

Examples 16 to 19

A coating composition was prepared as in Example 1 by combining the components according to Table 3 except that a dryer protectant (cyclohexanone oxime (Wako Pure Chemical Industries)) was used or the additive amount of the dryer protectant (2-butanone oxime (Tokyo Chemical Industry)) was changed.

From the atomic weight of cobalt: 58.93, the molecular weight of butanone oxime: 87.12, and the molecular weight of cyclohexanone oxime: 113.16, the number of moles of the dryer protectant per mole of metal elements in the dryer was calculated.

Examples 20 to 22

A coating composition was prepared as in Example 1 by combining the components according to Table 3 except that no dryer protectant was added and that eugenol (Wako Pure Chemical Industries) was added as a radical inhibitor.

Examples 23 and 24

A coating composition was prepared as in Example 1 by combining the components according to Table 3 except that the dryer protectant was used together with eugenol (Wako Pure Chemical Industries) or tributyl phosphite (Wako Pure Chemical Industries) serving as a radical inhibitor.

Example 25

Carbon black (MA 100; Mitsubishi Chemical Corporation) and oil clay (CLAYTON® HY (BYK Additives & Instruments)) were mixed with the alkyd resin varnish (BECKOSOL P-470-70; DIC Corporation) while being stirred with a disperser to prepare a premix paste, which was then dispersed by a sand grind mill to prepare a dispersed paste.

In a preparatory stage, paraffin (melting point: 42 to 44° C.) (Wako Pure Chemical Industries) and powder polyethylene (Neowax L (melting point: 95 to 115° C.) (Yasuhara Chemical Co., Ltd.)) were heated to 70° C. and 130° C., respectively, into a liquid state.

Paraffin and polyethylene in a liquid state were mixed while stirring the dispersed paste wormed to 40° C. with a disperser. Subsequently, a dryer protectant (2-butanone oxime (Tokyo Chemical Industry)) and a dryer (cobalt naphthenate mineral spirit solution (Co: 6%)) (Wako Pure Chemical Industries) were sequentially mixed and stirred at 300 rpm for five minutes. The components were combined according to Table 4.

After completion of stirring, the mixture was visually confirmed as being homogeneous and used as a coating composition.

Example 26

Titanium oxide (Ti-PURE R-706 (Du Pont)) and oil clay (CLAYTON® HY (BYK Additives & Instruments)) were mixed with the alkyd resin varnish (BECKOSOL P-470-70; DIC Corporation) while being stirred with a disperser to prepare a premix paste, which was then dispersed by a sand grind mill to prepare a dispersed paste.

In a preparatory stage, paraffin (melting point: 42 to 44° C.) (Wako Pure Chemical Industries) and powder polyethylene (Neowax L (melting point: 95 to 115° C.) (Yasuhara Chemical Co., Ltd.)) were heated to 70° C. and 130° C., respectively, into a liquid state.

Paraffin and polyethylene in a liquid state were mixed while stirring the dispersed paste wormed to 40° C. with a disperser. Subsequently, a dryer protectant (2-butanone oxime (Tokyo Chemical Industry)) and a dryer (cobalt naphthenate mineral spirit solution (Co: 6%)) (Wako Pure Chemical Industries) were sequentially mixed and stirred at 300 rpm for five minutes. The components were combined according to Table 4.

After completion of stirring, the mixture was visually confirmed as being homogeneous and used as a coating composition.

Example 27

A coating composition was prepared as in Example 1.

Comparative Example 1

In a preparatory stage, alkyd resin varnish (BECKOSOL P-470-70; DIC Corporation) was wormed to 40° C., and paraffin (melting point: 42 to 44° C.) (Wako Pure Chemical Industries) was heated to 70° C. into a liquid state. Paraffin in a liquid state was mixed while stirring the alkyd resin varnish wormed to 40° C. with a disperser. Subsequently, a dryer protectant (2-butanone oxime (Tokyo Chemical Industry)) and a dryer (cobalt naphthenate mineral spirit solution (Co: 6%)) (Wako Pure Chemical Industries) were sequentially mixed and stirred at 300 rpm for five minutes. The components were combined according to Table 5.

From the atomic weight of cobalt: 58.93 and the molecular weight of 2-butanone oxime: 87.12, the number of moles of the dryer protectant per mole of metal elements in the dryer was calculated.

After completion of stirring, the mixture was visually confirmed as being homogeneous and used as a coating composition.

Comparative Example 2

A coating composition was prepared as in Example 1 by combining the components according to Table 5 except that the combination ratio of paraffin to the base resin composition containing the alkyd resin varnish was increased.

Comparative Example 3

A coating composition was prepared as in Example 1 by combining the components according to Table 5 without using a dryer and an oxidative polymerization inhibitor.

Comparative Example 4

A coating composition was prepared as in Example 1 by combining the components according to Table 5 without using an oxidative polymerization inhibitor while using a dryer.

Comparative Example 5

A coating composition was prepared as in Example 1 by combining the components according to Table 5 without using paraffin.

TABLE 1

| | components | | NV | Example 1 (wt %) | Example 2 (wt %) | Example 3 (wt %) | Example 4 (wt %) |
|---|---|---|---|---|---|---|---|
| base resin composition | alkyd resin | BECKOSOL P-470-70 | 70 | 77.00 | 77.00 | 58.10 | 83.59 |
| | | BECKOSOL EL-8001 | 100 | — | — | — | — |
| | | BECKOSOL EL-4501-50 | 50 | — | — | — | — |
| | | STYRESOL J-719 | 50 | — | — | — | — |
| | alkyd-modified urethane resin | BURNOCK TD-125-HV | 50 | — | — | — | — |
| | acrylic resin | ACRYDIC A-1300 | 60 | — | — | — | — |
| organic compound | paraffin | melting point 42 to 44° C. | 100 | 18.35 | 21.35 | 40.64 | 14.64 |
| | | melting point 50 to 52° C. | 100 | — | — | — | — |
| | | melting point 60 to 62° C. | 100 | — | — | — | — |
| | polyethylene | Neowax L (melting point 95 to 115° C.) | 100 | 3.00 | — | — | — |
| | dryer | cobalt naphthenate mineral spirit solution (Co 6%) | 68 | 1.40 | 1.40 | 1.06 | 1.52 |
| | | cobalt octanoate xylene solution (Co 6%) | 32 | — | — | — | — |
| oxidative polymerization inhibitor | dryer protectant | 2-butanone oxime | 0 | 0.25 | 0.25 | 0.20 | 0.24 |
| | | cyclohexanone oxime | 0 | — | — | — | — |
| | radical inhibitor | eugenol | 0 | — | — | — | — |
| | | tributyl phosphite | 0 | — | — | — | — |
| pigment | color pigment | Mitsubishi Carbon Black MA 100 | 100 | — | — | — | — |
| | | Ti-PURE R-706 | 100 | — | — | — | — |
| | extender pigment | CLAYTON$^R$ HY | 100 | — | — | — | — |
| | | total | | 100.00 | 100.00 | 100.00 | 100.00 |
| | | organic compound with melting point of 5 to 150° C. (wt %)/100 wt % base resin | | 39.6 | 39.6 | 99.9 | 25.0 |
| | | Co in dryer (wt %)/100 wt % oxidative polymerization resin | | 0.16 | 0.16 | 0.16 | 0.16 |
| | | dryer protectant (mol)/mole of Co | | 2.0 | 2.0 | 2.1 | 1.8 |
| | | radical inhibitor (wt %)/100 wt % oxidative polymerization resin | | — | — | — | — |

| | components | | NV | Example 5 (wt %) | Example 6 (wt %) | Example 7 (wt %) | Example 8 (wt %) |
|---|---|---|---|---|---|---|---|
| base resin composition | alkyd resin | BECKOSOL P-470-70 | 70 | 88.78 | — | — | 70.21 |
| | | BECKOSOL EL-8001 | 100 | — | 70.09 | — | — |
| | | BECKOSOL EL-4501-50 | 50 | — | — | 82.44 | — |
| | | STYRESOL J-719 | 50 | — | — | — | 10.92 |
| | alkyd-modified urethane resin | BURNOCK TD-125-HV | 50 | — | — | — | — |
| | acrylic resin | ACRYDIC A-1300 | 60 | — | — | — | — |
| organic compound | paraffin | melting point 42 to 44° C. | 100 | 9.31 | 23.86 | 13.97 | 18.59 |
| | | melting point 50 to 52° C. | 100 | — | — | — | — |
| | | melting point 60 to 62° C. | 100 | — | — | — | — |
| | polyethylene | Neowax L (melting point 95 to 115° C.) | 100 | — | 3.90 | 2.30 | 3.04 |
| | dryer | cobalt naphthenate mineral spirit solution (Co 6%) | 68 | 1.62 | 1.82 | 1.09 | 1.42 |
| | | cobalt octanoate xylene solution (Co 6%) | 32 | — | — | — | — |
| oxidative polymerization inhibitor | dryer protectant | 2-butanone oxime | 0 | 0.29 | 0.33 | 0.20 | 0.25 |
| | | cyclohexanone oxime | 0 | — | — | — | — |
| | radical inhibitor | eugenol | 0 | — | — | — | — |
| | | tributyl phosphite | 0 | — | — | — | — |
| pigment | color pigment | Mitsubishi Carbon Black MA 100 | 100 | — | — | — | — |
| | | Ti-PURE R-706 | 100 | — | — | — | — |
| | extender pigment | CLAYTON$^R$ HY | 100 | — | — | — | — |
| | | total | | 100.00 | 100.00 | 100.00 | 100.00 |
| | | organic compound with melting point of 5 to 150° C. (wt %)/100 wt % base resin | | 15.0 | 39.6 | 39.5 | 39.6 |
| | | Co in dryer (wt %)/100 wt % oxidative polymerization resin | | 0.16 | 0.16 | 0.16 | 0.16 |
| | | dryer protectant (mol)/mole of Co | | 2.0 | 2.0 | 2.1 | 2.0 |
| | | radical inhibitor (wt %)/100 wt % oxidative polymerization resin | | — | — | — | — |

TABLE 2

| | components | | NV | Example 9 (wt %) | Example 10 (wt %) | Example 11 (wt %) | Example 12 (wt %) |
|---|---|---|---|---|---|---|---|
| base resin composition | alkyd resin | BECKOSOL P-470-70 | 70 | 73.73 | 70.66 | 77.00 | 77.00 |
| | | BECKOSOL EL-8001 | 100 | | | | |

TABLE 2-continued

| | | | NV | | | | |
|---|---|---|---|---|---|---|---|
| | | BECKOSOL EL-4501-50 | 50 | — | — | — | — |
| | | STYRESOL J-719 | 50 | — | — | — | — |
| | alkyd-modified urethane resin | BURNOCK TD-125-HV | 50 | 10.32 | — | — | — |
| | acrylic resin | ACRYDIC A-1300 | 60 | — | 8.24 | — | — |
| organic compound | paraffin | melting point 42 to 44° C. | 100 | 17.57 | 16.84 | — | 6.12 |
| | | melting point 50 to 52° C. | 100 | — | — | — | 6.12 |
| | | melting point 60 to 62° C. | 100 | — | — | 18.35 | 6.11 |
| | polyethylene | Neowax L (melting point 95 to 115° C.) | 100 | 2.87 | 2.75 | 3.00 | 3.00 |
| | dryer | cobalt naphthenate mineral spirit solution (Co 6%) | 68 | 1.34 | 1.28 | 1.40 | 1.40 |
| | | cobalt octanoate xylene solution (Co 6%) | 32 | — | — | — | — |
| oxidative polymerization inhibitor | dryer protectant | 2-butanone oxime | 0 | 0.24 | 0.23 | 0.25 | 0.25 |
| | | cyclohexanone oxime | 0 | — | — | — | — |
| | radical inhibitor | eugenol | 0 | — | — | — | — |
| | | tributyl phosphite | 0 | — | — | — | — |
| pigment | color pigment | Mitsubishi Carbon Black MA 100 | 100 | — | — | — | — |
| | | Ti-PURE R-706 | 100 | — | — | — | — |
| | extender pigment | CLAYTON$^R$ HY | 100 | — | — | — | — |
| | | total | | 100.00 | 100.00 | 100.00 | 100.00 |
| | organic compound with melting point of 5 to 150° C. (wt %)/100 wt % base resin | | | 36.0 | 36.0 | 39.6 | 39.6 |
| | Co in dryer (wt %)/100 wt % oxidative polymerization resin | | | 0.14 | 0.16 | 0.16 | 0.16 |
| | dryer protectant (mol)/mole of Co | | | 2.0 | 2.0 | 2.0 | 2.0 |
| | radical inhibitor (wt %)/100 wt % oxidative polymerization resin | | | — | — | — | — |

| | | components | NV | Example 13 (wt %) | Example 14 (wt %) | Example 15 (wt %) |
|---|---|---|---|---|---|---|
| base resin composition | alkyd resin | BECKOSOL P-470-70 | 70 | 77.00 | 78.08 | 68.31 |
| | | BECKOSOL EL-8001 | 100 | — | — | — |
| | | BECKOSOL EL-4501-50 | 50 | — | — | — |
| | | STYRESOL J-719 | 50 | — | — | — |
| | alkyd-modified urethane resin | BURNOCK TD-125-HV | 50 | — | — | — |
| | acrylic resin | ACRYDIC A-1300 | 60 | — | — | — |
| organic compound | paraffin | melting point 42 to 44° C. | 100 | 18.35 | 18.56 | 16.28 |
| | | melting point 50 to 52° C. | 100 | — | — | — |
| | | melting point 60 to 62° C. | 100 | — | — | — |
| | polyethylene | Neowax L (melting point 95 to 115° C.) | 100 | 3.00 | 3.04 | 2.66 |
| | dryer | cobalt naphthenate mineral spirit solution (Co 6%) | 68 | — | 0.27 | 10.79 |
| | | cobalt octanoate xylene solution (Co 6%) | 32 | 1.40 | — | — |
| oxidative polymerization inhibitor | dryer protectant | 2-butanone oxime | 0 | 0.25 | 0.05 | 1.98 |
| | | cyclohexanone oxime | 0 | — | — | — |
| | radical inhibitor | eugenol | 0 | — | — | — |
| | | tributyl phosphite | 0 | — | — | — |
| pigment | color pigment | Mitsubishi Carbon Black MA 100 | 100 | — | — | — |
| | | Ti-PURE R-706 | 100 | — | — | — |
| | extender pigment | CLAYTON$^R$ HY | 100 | — | — | — |
| | | total | | 100.00 | 100.00 | 100.00 |
| | organic compound with melting point of 5 to 150° C. (wt %)/100 wt % base resin | | | 39.6 | 39.5 | 39.6 |
| | Co in dryer (wt %)/100 wt % oxidative polymerization resin | | | 0.16 | 0.03 | 1.35 |
| | dryer protectant (mol)/mole of Co | | | 2.0 | 2.1 | 2.0 |
| | radical inhibitor (wt %)/100 wt % oxidative polymerization resin | | | — | — | — |

TABLE 3

| | | components | NV | Example 16 (wt %) | Example 17 (wt %) | Example 18 (wt %) | Example 19 (wt %) | Example 20 (wt %) |
|---|---|---|---|---|---|---|---|---|
| base resin composition | alkyd resin | BECKOSOL P-470-70 | 70 | 76.96 | 76.99 | 77.13 | 76.84 | 77.00 |
| | | BECKOSOL EL-8001 | 100 | — | — | — | — | — |
| | | BECKOSOL EL-4501-50 | 50 | — | — | — | — | — |
| | | STYRESOL J-719 | 50 | — | — | — | — | — |
| | alkyd-modified urethane resin | BURNOCK TD-125-HV | 50 | — | — | — | — | — |
| | acrylic resin | ACRYDIC A-1300 | 60 | — | — | — | — | — |
| organic compound | paraffin | melting point 42 to 44° C. | 100 | 18.31 | 18.35 | 18.38 | 18.31 | 18.35 |
| | | melting point 50 to 52° C. | 100 | — | — | — | — | — |
| | | melting point 60 to 62° C. | 100 | — | — | — | — | — |
| | polyethylene | Neowax L (melting point 95 to 115° C.) | 100 | 3.00 | 3.00 | 3.01 | 2.99 | 3.00 |

TABLE 3-continued

|  |  | components | NV |  |  |  |  |  |
|---|---|---|---|---|---|---|---|---|
|  | dryer | cobalt naphthenate mineral spirit solution (Co 6%) | 68 | 1.40 | 1.40 | 1.40 | 1.40 | 1.40 |
|  |  | cobalt octanoate xylene solution (Co 6%) | 32 | — | — | — | — | — |
| oxidative polymerization inhibitor | dryer protectant | 2-butanone oxime | 0 | — | 0.20 | 0.08 | 0.45 | — |
|  |  | cyclohexanone oxime | 0 | 0.33 | 0.06 | — | — | — |
|  | radical inhibitor | eugenol | 0 | — | — | — | — | 0.25 |
|  |  | tributyl phosphite | 0 | — | — | — | — | — |
| pigment | color pigment | Mitsubishi Carbon Black MA 100 | 100 | — | — | — | — | — |
|  |  | Ti-PURE R-706 | 100 | — | — | — | — | — |
|  | extender pigment | CLAYTON$^R$ HY | 100 | — | — | — | — | — |
|  |  | total |  | 100.00 | 100.00 | 100.00 | 100.00 | 100.00 |
|  |  | organic compound with melting point of 5 to 150° C. (wt %)/100 wt % base resin |  | 39.6 | 39.6 | 39.6 | 39.6 | 39.6 |
|  |  | Co in dryer (wt %)/100 wt % oxidative polymerization resin |  | 0.16 | 0.16 | 0.16 | 0.16 | 0.16 |
|  |  | dryer protectant (mol)/mole of Co |  | 2.0 | 2.0 | 0.6 | 3.6 | — |
|  |  | radical inhibitor (wt. %)/100 wt % oxidative polymerization resin |  | — | — | — | — | 0.46 |

|  |  | components | NV | Example 21 (wt %) | Example 22 (wt %) | Example 23 (wt %) | Example 24 (wt %) |
|---|---|---|---|---|---|---|---|
| base resin composition | alkyd resin | BECKOSOL P-470-70 | 70 | 76.45 | 77.18 | 76.90 | 76.90 |
|  |  | BECKOSOL EL-8001 | 100 | — | — | — | — |
|  |  | BECKOSOL EL-4501-50 | 50 | — | — | — | — |
|  |  | STYRESOL J-719 | 50 | — | — | — | — |
|  | alkyd-modified urethane resin | BURNOCK TD-125-HV | 50 | — | — | — | — |
|  | acrylic resin | ACRYDIC A-1300 | 60 | — | — | — | — |
| organic compound | paraffin | melting point 42 to 44° C. | 100 | 18.22 | 18.39 | 18.32 | 18.32 |
|  |  | melting point 50 to 52° C. | 100 | — | — | — | — |
|  |  | melting point 60 to 62° C. | 100 | — | — | — | — |
|  | polyethylene | Neowax L (melting point 95 to 115° C.) | 100 | 2.98 | 3.01 | 3.00 | 3.00 |
|  | dryer | cobalt naphthenate mineral spirit solution (Co 6%) | 68 | 1.39 | 1.40 | 1.40 | 1.40 |
|  |  | cobalt octanoate xylene solution (Co 6%) | 32 | — | — | — | — |
| oxidative polymerization inhibitor | dryer protectant | 2-butanone oxime | 0 | — | — | 0.20 | 0.20 |
|  |  | cyclohexanone oxime | 0 | — | — | 0.06 | 0.06 |
|  | radical inhibitor | eugenol | 0 | 0.96 | 0.02 | 0.12 | 0.08 |
|  |  | tributyl phosphite | 0 | — | — | — | 0.04 |
| pigment | color pigment | Mitsubishi Carbon Black MA 100 | 100 | — | — | — | — |
|  |  | Ti-PURE R-706 | 100 | — | — | — | — |
|  | extender pigment | CLAYTON$^R$ HY | 100 | — | — | — | — |
|  |  | total |  | 100.00 | 100.00 | 100.00 | 100.00 |
|  |  | organic compound with melting point of 5 to 150° C. (wt %)/100 wt % base resin |  | 39.6 | 39.6 | 39.6 | 39.6 |
|  |  | Co in dryer (wt %)/100 wt % oxidative polymerization resin |  | 0.16 | 0.16 | 0.16 | 0.16 |
|  |  | dryer protectant (mol)/mole of Co |  | — | — | 2.0 | 2.0 |
|  |  | radical inhibitor (wt. %)/100 wt % oxidative polymerization resin |  | 1.79 | 0.04 | 0.22 | 0.22 |

TABLE 4

|  |  | components | NV | Example 25 (wt %) | Example 26 (wt %) | Example 27 (wt %) |
|---|---|---|---|---|---|---|
| base resin composition | alkyd resin | BECKOSOL P-470-70 | 70 | 73.37 | 65.41 | 77.00 |
|  |  | BECKOSOL EL-8001 | 100 | — | — | — |
|  |  | BECKOSOL EL-4501-50 | 50 | — | — | — |
|  |  | STYRESOL J-719 | 50 | — | — | — |
|  | alkyd-modified urethane resin | BURNOCK TD-125-HV | 50 | — | — | — |
|  | acrylic resin | ACRYDIC A-1300 | 60 | — | — | — |
| organic compound | paraffin | melting point 42 to 44° C. | 100 | 17.48 | 15.59 | 18.35 |
|  |  | melting point 50 to 52° C. | 100 | — | — | — |
|  |  | melting point 60 to 62° C. | 100 | — | — | — |
|  | polyethylene | Neowax L (melting point 95 to 115° C.) | 100 | 2.86 | 2.55 | 3.00 |
|  | dryer | cobalt naphthenate mineral spirit solution (Co 6%) | 68 | 1.33 | 1.19 | 1.40 |
|  |  | cobalt octanoate xylene solution (Co 6%) | 32 | — | — | — |
| oxidative polymerization inhibitor | dryer protectant | 2-butanone oxime | 0 | 0.24 | 0.21 | 0.25 |
|  |  | cyclohexanone oxime | 0 | — | — | — |
|  | radical inhibitor | eugenol | 0 | — | — | — |
|  |  | tributyl phosphite | 0 | — | — | — |

TABLE 4-continued

| | components | | NV | Example 25 (wt %) | Example 26 (wt %) | Example 27 (wt %) |
|---|---|---|---|---|---|---|
| pigment | color pigment | Mitsubishi Carbon Black MA 100 | 100 | 0.18 | — | — |
| | | Ti-PURE R-706 | 100 | — | 11.01 | — |
| | extender pigment | CLAYTON$^R$ HY | 100 | 4.54 | 4.04 | — |
| | | total | | 100.00 | 100.00 | 100.00 |
| | organic compound with melting point of 5 to 150° C. (wt %)/100 wt % base resin | | | 39.6 | 39.6 | 39.6 |
| | Co in dryer (wt %)/100 wt % oxidative polymerization resin | | | 0.16 | 0.16 | 0.16 |
| | dryer protectant (mol) mole of Co | | | 2.0 | 2.0 | 2.0 |
| | radical inhibitor (wt %)/100 wt % oxidative polymerization resin | | | — | — | — |

TABLE 5

| | components | | NV | Comparative Example 1 (wt %) | Comparative Example 2 (wt %) | Comparative Example 3 (wt %) | Comparative Example 4 (wt %) | Comparative Example 5 (wt %) |
|---|---|---|---|---|---|---|---|---|
| base resin composition | alkyd resin | BECKOSOL P-470-70 | 70 | 96.87 | 53.70 | 78.29 | 77.19 | 97.90 |
| | | BECKOSOL EL-8001 | 100 | — | — | — | — | — |
| | | BECKOSOL EL-4501-50 | 50 | — | — | — | — | — |
| | | STYRESOL J-719 | 50 | — | — | — | — | — |
| | alkyd-modified urethane resin | BURNOCK TD-125-HV | 50 | — | — | — | — | — |
| | acrylic resin | ACRYDIC A-1300 | 60 | — | — | — | — | — |
| organic compound | paraffin | melting point 42 to 44° C. | 100 | 1.00 | 45.12 | 21.71 | 21.40 | — |
| | | melting point 50 to 52° C. | 100 | — | — | — | — | — |
| | | melting point 60 to 62° C. | 100 | — | — | — | — | — |
| | polyethylene | Neowax L (melting point 95 to 115° C.) | 100 | — | — | — | — | — |
| | dryer | cobalt naphthenate mineral spirit solution (Co 6%) | 68 | 1.81 | 1.00 | — | 1.40 | 1.78 |
| | | cobalt octanoate xylene solution (Co 6%) | 32 | — | — | — | — | — |
| oxidative polymerization inhibitor | dryer protectant | 2-butanone oxime | 0 | 0.32 | 0.18 | — | — | 0.32 |
| | | cyclohexanone oxime | 0 | — | — | — | — | — |
| | radical inhibitor | eugenol | 0 | — | — | — | — | — |
| | | tributyl phosphite | 0 | — | — | — | — | — |
| pigment | color pigment | Mitsubishi Carbon Black MA 100 | 100 | — | — | — | — | — |
| | | Ti-PURE R-706 | 100 | — | — | — | — | — |
| | extender pigment | CLAYTON$^R$ HY | 100 | — | — | — | — | — |
| | | total | | 100.00 | 100.00 | 100.00 | 100.00 | 100.00 |
| | organic compound with melting point of 5 to 150° C. (wt %)/100 wt % base resin | | | 1.5 | 120.0 | 39.6 | 39.6 | 0.0 |
| | Co in dryer (wt %)/100 wt % oxidative polymerization resin | | | 0.16 | 0.16 | — | 0.16 | 0.16 |
| | dryer protectant (mol)/mole of Co | | | 2.0 | 2.0 | — | — | 2.0 |
| | radical inhibitor (wt %)/100 wt % oxidative polymerization resin | | | — | — | — | — | — |

2. Formation of Compatible Coating Film

A composite coating film was formed with the following steps.

Step 1: Each of the coating compositions of Examples 1 to 27 and Comparative Examples 1 to 5 was applied to a dish-shaped container (base area: about 34 cm²) of about 3.3 cm in radius and about 7.5 mm in height to a dry film thickness of 2.5 mm (FIG. 2a).

Step 2: The created coating film was dried under an atmosphere at 23° C. for one day or dried under an atmosphere at 120° C. for 20 minutes to obtain a dry initial coating film (FIG. 2b).

Step 3: The coating film was dried under an atmosphere at 23° C. for six months (FIG. 2c) and a temporal change was observed to confirm formation of a desired composite coating film.

3. Characteristic Evaluation of Composite Coating Film

An evaluation test was performed on each of the obtained composite coating films under the following conditions. The evaluation results are shown in Tables 6 to 11.

(1) Surface Dryness of Composite Coating Film
[Purpose]
The cured state of the composite coating film surface is confirmed based on a degree of dryness.
[Test Conditions]
In accordance with the definition of JIS K 5600-3-2, about 0.5 g of Ballotini (fine glass beads classified such that the beads do not pass through a sieve of 125 μm in nominal (size) aperture and completely pass through a sieve of 250 μm) was dropped from the height of 100 mm onto a coated surface of a horizontally placed coated plate, and the test piece was tilted after 10 seconds and lightly swept with a brush to remove the Ballotini.
[Evaluation Criteria]
+: When the Ballotini can be removed without scratching, it is determined that a surface is dried.
−: When the Ballotini cannot be removed since the coating film is scratched or the Ballotini is stuck, it is determined that a surface is undried.

(2) Surface Tackiness of Composite Coating Film
[Purpose]
The cured state of the composite coating film surface layer is confirmed based on a degree of stickiness.

[Test Conditions]

Under an atmosphere at 23° C., the surface of the coating film was pressed with a finger to evaluate the presence/absence of stickiness (tackiness).

[Evaluation Criteria]

+: sticky.

−: not sticky.

(3) Rebound Resilience of Composite Coating Film

[Purpose]

The coating film is made up of a viscous component and an elastic component. The elastic component stores a falling energy (kinetic energy) of this test, while the viscous component causes a loss of the energy. A key point of the technique of allowing peeling multiple times is that only the surface layer is reacted and cured while the inside is in the uncured state, and the rebound resilience in this test is expected to be lower than that of a conventional completely cured coating film. By comparing this value, it is shown that the inside is unreacted.

[Test Conditions]

From a position of height H1 (70 cm) under an atmosphere at 23° C., a rubber ball (made of silicone and having a spherical shape with the diameter of 2 cm, the weight of 5 g, and the hardness of 50 measured in accordance with JIS K 6253-2012 "Rubber, vulcanized or thermoplastic—Determination of hardness—") was allowed to free-fall onto a coating film placed on a marble base, and the rebounding height H2 of the rubber ball in this case was measured (FIG. 3). By using the height H1 as a denominator and the rebound height H2 as a numerator, rebound resilience (%) expressing the value thereof as a percentage is defined to make evaluations based on the magnitude of the value. The test was performed three times and the average value was used. A film thickness of a coating film sample A for the measurement test was standardized to 2.5 mm so as to eliminate the influence of film thickness.

[Evaluation Criteria]

Rebound resilience of 0 to 10%: The surface layer is insufficiently cured.

Rebound resilience of 11 to 55%: The surface layer is sufficiently cured and the inner layer is in an uncured state.

Rebound resilience of 56% or more: The inside is excessively cured.

(4) Internal Flowability of Composite Coating Film

[Purpose]

A coating-film flow suppression effect of a flow suppressing substance is clarified.

[Test Conditions]

Under an atmosphere at 23° C., a created coated plate was tilted by 90° and allowed to stand for one hour, and the presence/absence of flow (deformation) was visually confirmed.

[Evaluation Criteria]

+: No cracks or wrinkles are observed in the film layer and no distortion has occurred in the entire coating film.

−: Cracks or wrinkles are observed in the film layer, or distortion has occurred in the entire cording film.

(5) Peelability of Film Layer

[Purpose]

For the coating film proved as having the cured surface layer in the test described above, it is confirmed whether the film layer can be peeled off.

[Test Conditions]

Figure 4:
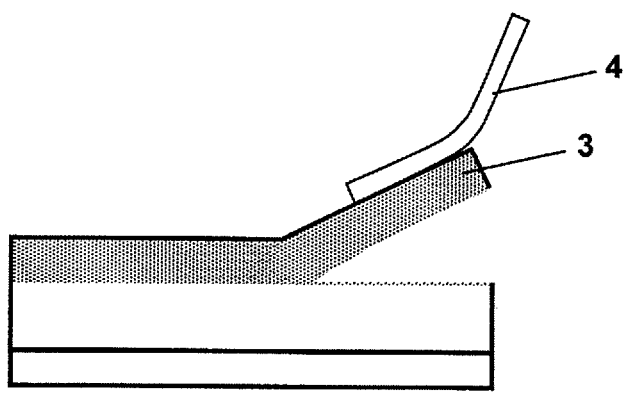
FIG. 4 is a schematic for explaining a peeling test.

After the coating film was cut off at a portion adhering to the inner wall of the dish-shaped container with a cutter knife, a cellophane tape (Cellotape CT-24; Nichiban) was attached to a portion of the coating film surface layer and the cellophane tape was pulled up (FIG. 4). A peeled film thickness was measured with an electronic caliper.

[Evaluation Criteria]

++: When all the film layer can be peeled off from the inner layer without breaking along the way, it is determined as being peelable.

+: Even though the film layer is broken along the way, when all the film layer can finally be peeled off from the inner layer, it is determined as being peelable.

−: If at least a portion of the film layer cannot be peeled off from the inner layer, it is determined as not being peelable.

TABLE 6

| evaluation period | evaluation items | Example 1 | Example 2 | Example 3 | Example 4 | Example 5 | Example 6 | Example 7 | Example 8 |
| --- | --- | --- | --- | --- | --- | --- | --- | --- | --- |
| 23° C. × 20 min (reference) | rebound resilience (%) | 9.9 | 7.0 | 18.3 | 4.9 | 3.7 | 8.1 | 12.3 | 21.7 |
| | surface dryness | − | − | − | − | − | − | − | − |
| | surface tackiness | − | − | − | − | − | − | − | − |
| | internal flow | + | + | + | + | + | + | + | + |
| 23° C. × 1 day | rebound resilience (%) | 33.5 | 22.8 | 36.8 | 18.5 | 12.3 | 31.4 | 35.7 | 39.1 |
| | surface dryness | + | + | + | + | + | + | + | + |
| | surface tackiness | + | + | + | + | + | + | + | + |
| | internal flow | + | + | + | + | + | + | + | + |
| | peeling | ++ | ++ | ++ | ++ | ++ | ++ | ++ | ++ |
| | peeled film thickness (μm) | 120 | 220 | 170 | 240 | 280 | 170 | 130 | 150 |
| 23° C. × 6 months | rebound resilience (%) | 40.2 | 31.0 | 43.7 | 27.9 | 49.9 | 41.5 | 41.1 | 44.0 |
| | surface dryness | + | + | + | + | + | + | + | + |
| | surface tackiness | + | + | + | + | + | + | + | + |
| | internal flow | + | + | + | + | + | + | + | + |
| | peeling | ++ | ++ | ++ | ++ | ++ | ++ | ++ | ++ |
| | peeled film thickness (μm) | 190 | 320 | 270 | 310 | 850 | 250 | 210 | 230 |

TABLE 7

| evaluation period | evaluation items | Example 9 | Example 10 | Example 11 | Example 12 | Example 13 | Example 14 | Example 15 |
|---|---|---|---|---|---|---|---|---|
| 23° C. × 20 min (reference) | rebound resilience (%) | 22.9 | 19.4 | 29.2 | 14.3 | 9.2 | 9.8 | 9.2 |
| | surface dryness | − | − | − | − | − | − | − |
| | surface tackiness | − | − | − | − | − | − | − |
| | internal flow | + | + | + | + | + | + | + |
| 23° C. × 1 day | rebound resilience (%) | 38.7 | 41.1 | 38.6 | 35.7 | 31.9 | 17.4 | 36.1 |
| | surface dryness | + | + | + | + | + | + | + |
| | surface tackiness | + | + | + | + | + | + | + |
| | internal flow | + | + | + | + | + | + | + |
| | peeling | ++ | ++ | ++ | ++ | ++ | + | ++ |
| | peeled film thickness (μm) | 110 | 130 | 100 | 110 | 120 | 80 | 250 |
| 23° C. × 6 months | rebound resilience (%) | 43.8 | 44.0 | 46.2 | 43.0 | 40.1 | 24.6 | 53.1 |
| | surface dryness | + | + | + | + | + | + | + |
| | surface tackiness | + | + | + | + | + | + | + |
| | internal flow | + | + | + | + | + | + | + |
| | peeling | ++ | ++ | ++ | ++ | ++ | ++ | ++ |
| | peeled film thickness (μm) | 200 | 220 | 180 | 190 | 200 | 170 | 970 |

TABLE 8

| evaluation period | evaluation items | Example 16 | Example 17 | Example 18 | Example 19 | Example 20 | Example 21 | Example 22 | Example 23 | Example 24 |
|---|---|---|---|---|---|---|---|---|---|---|
| 23° C. × 20 min (reference) | rebound resilience (%) | 10.0 | 10.0 | 9.7 | 9.9 | 10.3 | 10.0 | 9.8 | 9.5 | 9.8 |
| | surface dryness | − | − | − | − | − | − | − | − | − |
| | surface tackiness | − | − | − | − | − | − | − | − | − |
| | internal flow | + | + | + | + | + | + | + | + | + |
| 23° C. × 1 day | rebound resilience (%) | 28.9 | 29.9 | 35.2 | 14.2 | 31.1 | 14.7 | 36.3 | 26.2 | 24.3 |
| | surface dryness | + | + | + | + | + | + | + | + | + |
| | surface tackiness | + | + | + | + | + | + | + | + | + |
| | internal flow | + | + | + | + | + | + | + | + | + |
| | peeling | ++ | ++ | ++ | + | ++ | + | ++ | ++ | ++ |
| | peeled film thickness (μm) | 100 | 110 | 200 | 70 | 100 | 60 | 190 | 100 | 100 |
| 23° C. × 6 months | rebound resilience (%) | 35.2 | 36.7 | 43.9 | 24.0 | 40.1 | 23.7 | 43.1 | 30.2 | 27.2 |
| | surface dryness | + | + | + | + | + | + | + | + | + |
| | surface tackiness | + | + | + | + | + | + | + | + | + |
| | internal flow | + | + | + | + | + | + | + | + | + |
| | peeling | ++ | ++ | ++ | ++ | ++ | ++ | ++ | ++ | ++ |
| | peeled film thickness (μm) | 180 | 190 | 870 | 170 | 150 | 120 | 820 | 130 | 120 |

TABLE 9

| evaluation period | evaluation items | Example 25 | Example 26 |
|---|---|---|---|
| 23° C. × 20 min (reference) | rebound resilience (%) | 30.2 | 37.5 |
| | surface dryness | − | − |
| | surface tackiness | − | − |
| | internal flow | + | + |
| 23° C. × 1 day | rebound resilience (%) | 43.5 | 47.2 |
| | surface dryness | + | + |
| | surface tackiness | + | + |
| | internal flow | + | + |
| | peeling | ++ | ++ |
| | peeled film thickness (μm) | 140 | 130 |
| 23° C. × 6 months | rebound resilience (%) | 49.2 | 51.5 |
| | surface dryness | + | + |
| | surface tackiness | + | + |
| | internal flow | + | + |
| | peeling | ++ | ++ |
| | peeled film thickness (μm) | 230 | 220 |

TABLE 10

| evaluation period | evaluation items | Example 27 |
|---|---|---|
| 120° C. × 20 min. | rebound resilience (%) | 46.0 |
| | surface dryness | + |
| | surface tackiness | + |
| | internal flow | + |
| | peeling | ++ |
| | peeled film thickness (μm) | 90 |
| 23° C. × 6 months | rebound resilience (%) | 46.4 |
| | surface dryness | + |
| | surface tackiness | + |
| | internal flow | + |
| | peeling | ++ |
| | peeled film thickness (μm) | 90 |

TABLE 11

| evaluation period | evaluation items | Comparative Example 1 | Comparative Example 2 | Comparative Example 3 | Comparative Example 4 | Comparative Example 5 |
|---|---|---|---|---|---|---|
| 23° C. × 20 min (reference) | rebound resilience (%) | 0.0 | 25.0 | 6.9 | 7.1 | 0.0 |
| | surface dryness | − | − | − | − | − |
| | surface tackiness | − | − | − | − | − |
| | internal flow | − | + | + | + | − |
| 23° C. × 1 day | rebound resilience (%) | 0.0 | 25.4 | 8.4 | 35.1 | 17.5 |
| | surface dryness | − | − | − | + | + |
| | surface tackiness | − | − | − | + | + |
| | internal flow | − | − | − | + | − |
| | peeling | not applicable | not applicable | not applicable | ++ | ++ |
| | peeled film thickness (μm) | − | − | − | 120 | 360 |
| 23° C. × 6 months | rebound resilience (%) | 68.0 | 56.2 | 59.6 | 69.6 | 71.3 |
| | surface dryness | + | + | + | + | + |
| | surface tackiness | + | + | + | + | + |
| | internal flow | + | + | + | + | + |
| | peeling | − (completely cured) | − (completely cured) | − (completely cured) | − (completely cured) | − (completely cured) |
| | peeled film thickness (μm) | − | − | − | − | − |

All of the coating films created by using the coating compositions of Examples 1 to 27 exhibited proper rebound resilience (11 to 55%) and favorable surface dryness and surface tackiness even after one day at 23° C. or 20 minutes at 120° C. and after six months at 23° C. Internal flowability was favorable after initial coating without cracks or wrinkles formed on the coating film surface, and no deformation had occurred at all.

For example, immediately after peeling off the film layers of the composite coating films using the coating compositions of Examples 1 and 2 after six months, the rebound resilience was measured as 7.9% and 10.1%, respectively, and it was confirmed that the inner layer was maintained in the uncured state even after being dried for six months.

On the other hand, the coating films created by using the coating compositions of Comparative Examples 1 to 5 lacking any of the components contained in the coating composition according to the present invention were completely cured to the inner layer in six months and had the rebound resilience increased to about 56 to 70%.

INDUSTRIAL APPLICABILITY

By using the coating composition of the present invention, a composite coating film made up of a cured film layer and an uncured inner layer can be obtained, and this film layer can be peeled off to renew the coating surface layer multiple times. Therefore, by applying the coating composition of the present invention, a state without damage or contamination can always be kept, or the function imparted to the coating film can be maintained, even in a place where recoating is difficult, for example.

EXPLANATIONS OF LETTERS OR NUMERALS 1 basal plate
2 uncured portion of coating film
3 cured portion of coating film
4 cellophane tape
A coating sample for measurement having coating film thickness of 2.5 mm

The invention claimed is:

1. A coating composition comprising:
a base resin composition comprising an oxidative polymerization resin;
an organic compound having a melting point of 5 to 150° C.;
a dryer; and
an oxidative polymerization inhibitor comprising at least one of a dryer protectant and a radical inhibitor,
wherein the coating composition comprises 10 to 100 wt % of the organic compound based on 100 wt % of the base resin composition and an effective amount of the dryer such that a content of metal elements in the dryer is 0.001 to 1.5 wt % based on 100 wt % solid content of the oxidative polymerization resin, and
wherein
if the oxidative polymerization inhibitor comprises one of the dryer protectant and the radical inhibitor,
0.5 to 4 moles of the dryer protectant is contained per mole of metal elements in the dryer; or
0.01 to 2.0 wt % of the radical inhibitor is contained based on 100 wt % solid content of the oxidative polymerization resin; or
if the oxidative polymerization inhibitor comprises both of the dryer protectant and the radical inhibitor,
when 0.5 to 4 moles of the dryer protectant is contained per mole of metal elements in the dryer, 2.0 wt % or less of the radical inhibitor is contained based on 100 wt % solid content of the oxidative polymerization resin; or
when less than 0.5 moles of the dryer protectant is contained per mole of metal elements in the dryer, 0.01 to 2.0 wt % of the radical inhibitor is contained based on 100 wt % solid content of the oxidative polymerization resin.

2. The coating composition according to claim 1, wherein the oxidative polymerization resin is an alkyd resin that is a reaction product of a polybasic acid or a polybasic acid anhydride, a fatty acid, and a polyhydric alcohol.

3. The coating composition according to claim 1, wherein the oxidative polymerization inhibitor is a volatile substance having a boiling point of 300° C. or less.

4. A composite coating film comprising:
a film layer; and
an inner layer, wherein
the inner layer is an uncured body of the coating composition according to claim 1, and the film layer is a cured body of the coating composition formed in a peelable manner on a surface of the inner layer, and wherein
a surface layer of the inner layer exposed to air by peeling the film layer formed on the inner layer is cured due to oxidative polymerization so that another film layer is formable in a peelable manner.

5. The composite coating film according to claim 4, wherein the film layer is determined as being surface-dry based on the definition of JIS K 5600-3-2.

6. The composite coating film according to claim 5, wherein the rebound resilience is 11 to 55%.

7. The composite coating film according to claim 4, wherein the film layer has a thickness in a range of 10 μm to 5 mm, and wherein the inner layer has a thickness equal to or greater than the thickness of the film layer.

8. The composite coating film according to claim 4, wherein the another film layer has a thickness in a range of 10 μm to 5 mm.

9. A method of manufacturing a composite coating film made up of a film layer and an inner layer such that the film layer is formed in a peelable manner on a surface of the inner layer, the method comprising the steps of:
applying the coating composition according to claim 1 onto a basal plate to form a coating film made up of an uncured body of the coating composition; and
exposing the coating film made up of the uncured body to air to cure a surface layer thereof due to oxidative polymerization so as to form the film layer while maintaining a portion under the film layer in an uncured state as an inner layer.

10. The method of manufacturing according to claim 9, wherein the film layer has a thickness in a range of 10 μm to 5 mm, and wherein the inner layer has a thickness equal to or greater than the thickness of the film layer.

* * * * *